United States Patent [19]

Peterson

[11] Patent Number: 5,473,133
[45] Date of Patent: Dec. 5, 1995

[54] PROJECTION RESISTANCE WELDING METHOD

[75] Inventor: Warren A. Peterson, Hobart, Ind.

[73] Assignee: Inland Steel Company, Chicago, Ill.

[21] Appl. No.: 260,760

[22] Filed: Jun. 16, 1994

[51] Int. Cl.$^6$ ............................ B23K 11/06; B23K 11/14
[52] U.S. Cl. .................................. 219/93; 219/81; 219/82; 219/83
[58] Field of Search .................................. 219/81, 82, 83, 219/93

[56] References Cited

U.S. PATENT DOCUMENTS

| | | | |
|---|---|---|---|
| 1,172,301 | 2/1916 | Murray et al. | 219/93 |
| 1,172,302 | 2/1916 | Murray | 219/93 |
| 1,249,532 | 12/1917 | Smith et al. | 219/93 |
| 1,822,197 | 9/1931 | Bowlus | 219/93 |
| 3,256,419 | 6/1966 | Taylor et al. | 219/83 |
| 3,652,820 | 3/1972 | Boose | 219/83 |
| 5,063,278 | 11/1991 | Konno et al. | 219/86.1 |

FOREIGN PATENT DOCUMENTS

| | | |
|---|---|---|
| 2812415A1 | 10/1978 | Germany . |
| 3220457A1 | 12/1983 | Germany . |
| 56-131095 | 10/1981 | Japan . |
| 2-75473 | 3/1990 | Japan . |
| 1109302A | 8/1984 | U.S.S.R. . |
| 1120942 | 7/1968 | United Kingdom ..................... 219/81 |
| 2115131A | 9/1983 | United Kingdom . |

OTHER PUBLICATIONS

Makarov, et al., "Resistance Projection-Seam Welding of Low-Carbon Steel with Reduced-Pause Current Pulses on MSHP Machines," *Svarochnoe Proizvodstvo*, vol. 18, No. 11, p. 42 (Nov., 1971).

Williams, et al., "High Speed Resistance Seam Welding of Uncoated and Coated Steels," p. 71, British Steel Corporation (1988).

Primary Examiner—Philip H. Leung
Assistant Examiner—J. Pelham
Attorney, Agent, or Firm—Marshall, O'Toole, Gerstein, Murray & Borun

[57] ABSTRACT

Two pieces of steel strip are welded together by a method employing projection resistance welding. A portion of one strip is formed with a series of aligned projections and arranged in superimposed relation with a portion of the other strip. The superimposed portions are moved through a welding zone located between upper and lower electrodes, typically a pair of rotatable welding wheels, through which a continuous electrical current flows. As the projections move into and through the welding zone, they are heated, flattened, melted and welded to the other of the two superimposed portions. The projections may be in the form of a continuous, elongated ridge (when the steel strips are uncoated) or in the form of spaced apart dimples (when the steel strips are coated or uncoated).

24 Claims, 2 Drawing Sheets

PROJECTION RESISTANCE WELDING METHOD

BACKGROUND OF THE INVENTION

The present invention relates generally to resistance welding and more particularly to a method for welding together at least two pieces of steel employing projection resistance welding.

In resistance welding, two pieces of steel are welded by bringing them together, sandwiching them between a pair of welding electrodes, and applying an electric current through the electrodes at the location where the electrodes contact the two pieces of steel; this heats up the two pieces of steel where they are contacted by the electrodes, causing melting of the steel at that location. When the flow of electric current is stopped, the molten metal solidifies as a weld button or nugget, thereby adhering together the two pieces of steel. The heating which the two pieces of steel undergo as a result of resistance welding is proportional to (1) the electrical resistance of the steel material, (2) the square of the electric current, and (3) the time period during which the current flows.

In projection resistance welding, the electric current is more fully concentrated at the location where the two steel pieces are contacted by the electrodes. This is accomplished by pre-forming, on a portion of one of the steel pieces, a series of aligned projections. The aligned series of projections may be continuous, e.g. in the form of a continuous elongated ridge, or discontinuous, e.g. in the form of a plurality of spaced-apart dimples. The two pieces of steel to be welded together are arranged so that a portion of one piece is in superimposed relation with the series of projections on the other piece.

The welding electrodes in projection resistance welding are typically in the form of a pair of rotatable wheels. The two superimposed portions of steel are sandwiched between the pair of rotatable welding wheels. The welding operation then moves either (a) the two pieces of steel relative to the welding wheels or (b) the pair of welding wheels relative to the two pieces of steel. The zone of welding is, at any given time, concentrated at the location where the welding wheels engage the two pieces of steel. Moving either the two pieces of steel or the pair of welding wheels advances the welding zone. The welding wheels rotate as the welding zone is advanced, and pressure is applied to the sandwiched portions of the two pieces of steel by applying pressure through the welding wheels as the latter rotate; this causes a flattening of that part of the series of aligned projections which are sandwiched between the welding wheels in the welding zone. A continuous welding current is applied to the superimposed portions of the two pieces of steel, through the welding wheels, to concentrate the current at those projections which are in the welding zone. The intent is to form weldments where the projections are flattened.

Projection resistance welding can also employ (i) a single, rotatable welding wheel as an upper electrode and (ii) an elongated, stationary copper backing bar, extending the length of the steel pieces undergoing welding, as the lower electrode.

For productivity purposes, it is desirable that the speed of advancement at the welding zone be relatively high. In manufacturing lines where there are manufacturing operations either upstream and/or downstream of the welding operation, it is desirable that the speed of advancement at the welding zone be equal to the speed at which other manufacturing operations are performed either upstream or downstream of the welding operation.

It is also important that the welding current range be relatively wide. A welding current range has minimum and maximum limits. The minimum limit for a welding current range is that current at which welding would be obtained for all welds; this includes not only the welds formed on all projections on a given set of two pieces of steel, but also on all such sets in a continuous manufacturing operation. The maximum limit on the welding current range is that current at which melting occurs on the outer surface of a piece of steel or molten metal is expelled from the interface between the two pieces of steel at the location of a weldment (expulsion).

It is desirable to have a relatively wide welding current range because there are a number of uncontrollable factors which can cause wide fluctuations in the welding current during a given welding operation. Examples of such factors include variations in the surface condition of one or both of the two pieces of steel undergoing welding. Surface conditions include surface roughness and/or rust. Intermittent rust on the surface of a steel piece or variations in rust from a steel piece in one set to a steel piece in another set, during a continuous manufacturing operation, can cause a current change as high as 1,000–2,000 amperes.

The steel pieces are typically formed from steel strip which has been wound into coils which are unwound to form the steel pieces which undergo welding. In a continuous manufacturing operation, several coils may be consumed in a run over a relatively short period of time. Changes in surface conditions or in resistivity from one coil to another can cause variations in current similar to those described in the preceding paragraph.

Other causes of variations in the welding current include electrical malfunctions, power line fluctuations and the like. Indeed, even in well maintained welding equipment, there can be a 400 ampere variation in current, for example. Current changes could also be caused by changes in the pressure exerted by the welding wheels, due to mechanical factors in the pressure mechanism.

Because of all the variables which can affect the welding current, it is desirable to have a welding current range of at least 3,000 amperes.

In order to utilize projection resistance welding in high speed manufacturing operations, the speed of advancement of the welding zone (welding speed) should be substantially greater than about 200 inches per minute (508 cm/min.) e.g. greater than about 250 in./min. (635 cm/min.).

Welding can be enhanced by concentrating the current at the welding zone, rather than dissipating the current around that zone. Concentrating the current, i.e. increasing the current density (current per unit area), has been obtained in the past by narrowing the thickness or width of a welding wheel at its circumference, but this has a drawback in that it can cause undesirable surface marks due to deformation of the surface of the steel engaged by the narrower welding wheel.

Welding wheels having a flat, relatively wide circumferential surface or a convex circumferential surface with a relatively large radius of curvature, avoid the drawback described in the preceding sentence, but lack the current-concentrating properties of a narrower welding wheel.

SUMMARY OF THE INVENTION

In accordance with the present invention, it has been determined that one can obtain the combination of (1) a relatively wide welding current range (greater than 3,000 amperes) and (2) a fast welding speed, i.e., substantially greater than 200 in./min. (508 cm/min.), by utilizing a series of aligned projections on one of the two steel pieces undergoing welding. This combination of wide welding current range and fast welding speed can be obtained with coated steels (e.g. electro-galvanized steels) or with uncoated steels; it can be obtained with high strength steels or with lower strength steels; it can be obtained with a relatively wide, flat circumferential surface on the welding wheel and with a convex circumferential surface having a relatively large radius.

The series of aligned projections may comprise a plurality of spaced-apart dimples or they may define a continuous, elongated ridge.

Other features and advantages are inherent in the method claimed and disclosed or will become apparent to those skilled in the art from the following detailed description in conjunction with the accompanying diagrammatic drawings.

DETAILED DESCRIPTION

Figure 1:
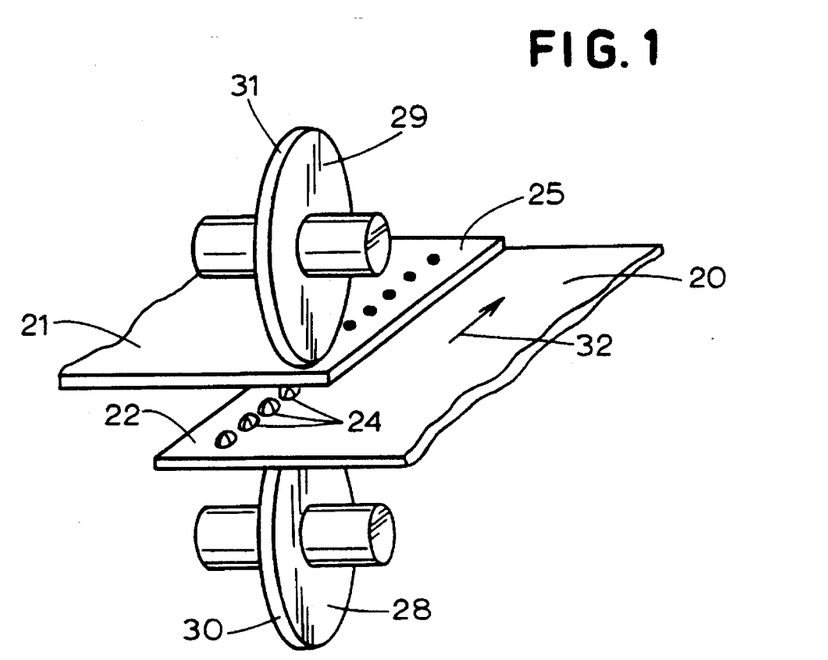
FIG. 1 is a perspective illustrating a projection resistance welding method in accordance with an embodiment of the present invention.

FIG. 1 shows two unconnected pieces of steel 20, 21 each derived from a steel strip typically cut from a coil of steel strip. As used herein the term "unconnected pieces of steel" means that the steel pieces are initially unconnected in the area of the welding zone, but they may be connected elsewhere remote from the welding zone.

Figure 2:
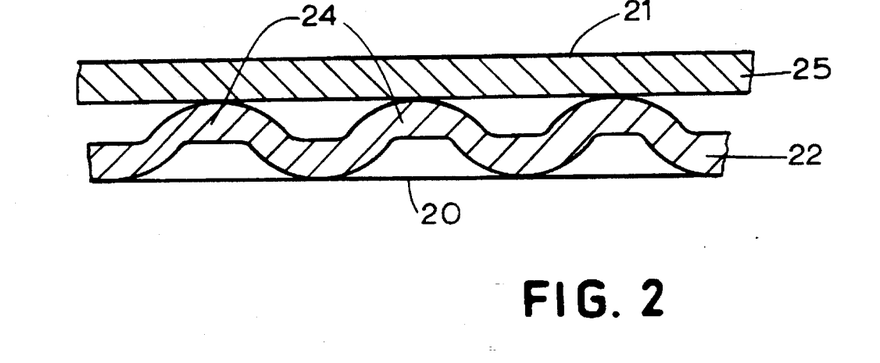
FIG. 2 is a fragmentary, side sectional view illustrating two pieces of steel which are to undergo welding in accordance with the present invention.
Figures 3, 4:
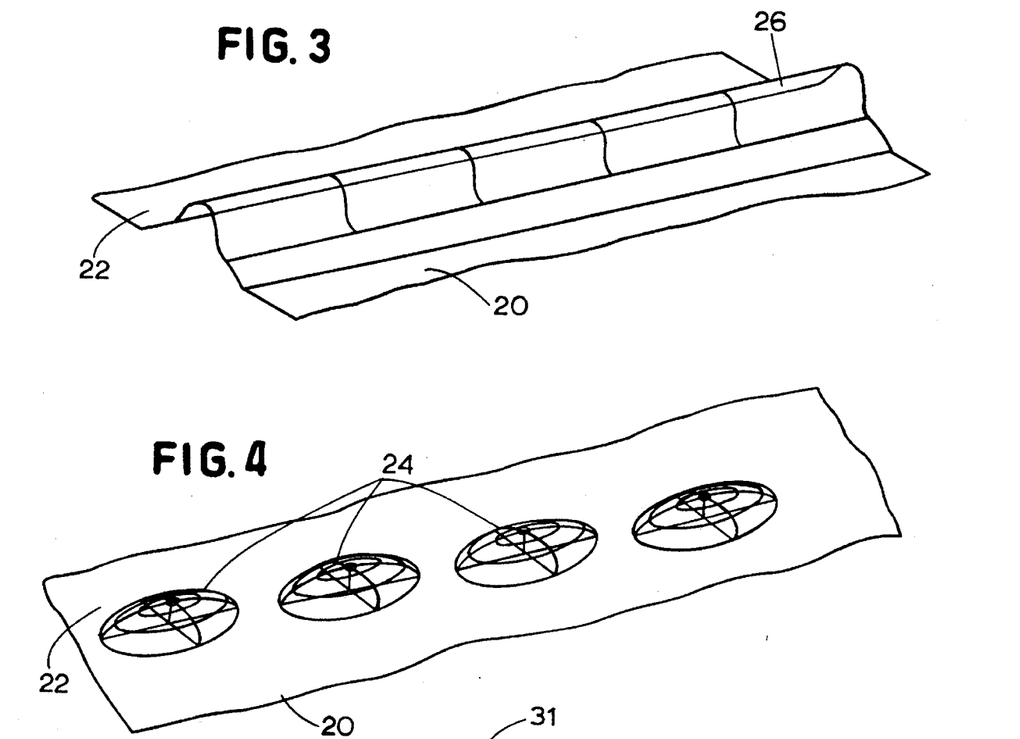
FIG. 3 is a perspective illustrating one embodiment of a series of aligned projections for use in accordance with the present invention.
FIG. 4 is a perspective illustrating a series of aligned, spaced-apart dimples for use in accordance with the present invention.

Steel piece 20 has edge portion 22 on which are formed a series of aligned projections 24 which, in this embodiment, are in the form of a series of spaced-apart dimples (see FIGS. 2 and 4). Projections 24 may be formed in a conventional manner, e.g. by roll forming. In other embodiments, the series of aligned projections may define a continuous elongated ridge 26 (FIG. 3). Steel piece 21 has an edge portion 25, and the two steel pieces 20, 21 are arranged so that edge portion 25 of steel piece 21 is in superimposed relation with the series of aligned projections 24 on edge portion 22 of steel piece 20 and with edge portion 22.

Superimposed edge portions 21, 22 are sandwiched between a pair of rotatable welding wheels 28, 29 at a welding zone defined by the steel material located between wheels 28, 29. The welding zone is advanced by moving either (a) steel pieces 20, 21 in the direction of arrow 32, or (b) by moving welding wheels 28, 29 in an opposite direction to arrow 32. Welding wheels 28, 29 rotate as the welding zone advances; welding wheel rotation occurs whether strips 20, 21 are moved in the direction of arrow 32 or welding wheels 28, 29 are moved in an opposite direction. As welding wheels 28, 29 rotate, pressure is applied to sandwiched, superimposed edge portions 22, 25 of steel pieces 20, 21 to flatten projections 24. Simultaneously with the application of pressure, a continuous welding current is applied to superimposed edge portions 22, 25, through welding wheels 28, 29 to concentrate the welding current at projections 24 and form weldments where the projections are flattened.

In accordance with the present invention, the welding zone is advanced at a speed substantially greater than about 200 in./min. (508 cm/min.), e.g. greater than about 250 in./min. (635 cm/min.). Also in accordance with the present invention, a welding current range greater than about 3,000 amperes is attained.

Except as otherwise described below, welding wheels 28, 29 are of conventional construction and are supplied with current by the employment of conventional circuitry of the type heretofore utilized for resistance seam welding (forming a continuous linear weld).

Figure 6:
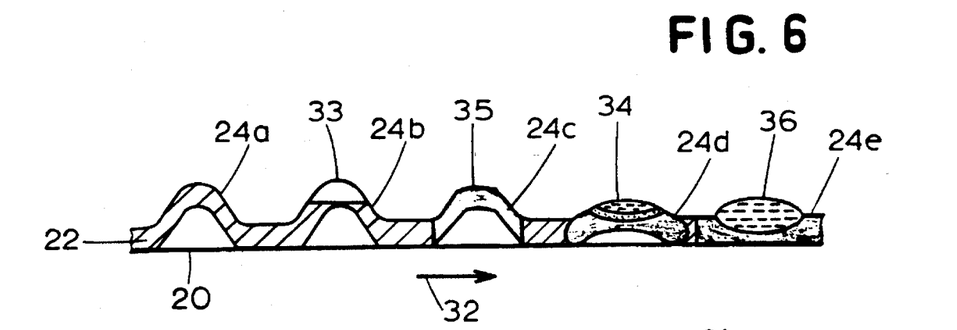
FIG. 6 is a side sectional view of a piece of steel having an aligned series of projections and illustrating the flattening and heating which that piece of steel undergoes when subjected to a welding method in accordance with the present invention.

FIG. 6 (on sheet 1) illustrates the sequence in which a projection 24 undergoes flattening, heating, melting and welding when subjected to projection resistance welding in accordance with the present invention. Welding wheels 28, 29 are not shown in FIG. 6, for purposes of clarity of illustration, but the affects thereof are illustrated in FIG. 6, as will be explained below.

Projection 24a is upstream of the welding wheels and is indicative of projections which have yet to be affected by the action of the welding wheels.

Projection 24b is representative of projections which undergo pre-heating prior to the movement of that projection into direct alignment with those parts of welding wheels 28, 29 which sandwich between them edge portions 22, 25 of steel pieces 20, 21. The area on projection 24b undergoing pre-heating is indicated by shading at 33 in FIG. 6. In some embodiments, there is pre-heating on at least two projections 24 upstream of the area of direct alignment with the welding wheels. The number of projections 24 undergoing pre-heating depends upon the spacing between projections, e.g. a spacing of 0.4 in. (1.0 cm) can result in the pre-heating of two projections 24.

Projection 24c is representative of projections which are undergoing both flattening and heating as steel piece 20 advances in the direction of arrow 32. The area on projection 24c undergoing heating is indicated by shading at 35 in FIG. 6. At 24d, the projection is mostly flattened, totally heated, and melting has started at 34. At 24e, flattening is completed, and there is sufficient melting and heating of the projection and of an overlying part of edge portion 25 on steel piece 21 (not shown in FIG. 6) to form a weldment at 36.

Expulsion of molten metal during advancement of a projection through the welding zone is controlled by the continued application of force throughout the collapse of a projection. This spreads out the area undergoing heating and prevents excessive melting. The expulsion described in the next-to-last sentence should not be confused with a very small amount of expulsion which occurs at the tip of each dimple 24 as the dimple enters the welding zone.

As noted above, there is some welding on that part of edge portion 25 in contact with projection 24e on edge portion 22;

there is also some heating on that part of edge portion 25 in contact with projection 24d. However, because edge portion 25 is flat, whereas edge portion 22 is formed with projections 24, the current flowing through edge portion 25 is not as concentrated as the current flowing through edge portion 22, and, as a result, those parts of edge portion 25 aligned with projections 24 on edge portion 22 undergo less heating than do projections 24.

Figure 5:
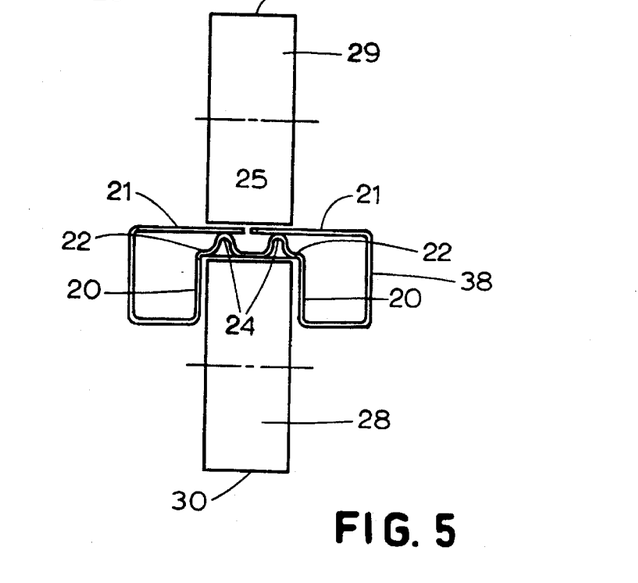
FIG. 5 is an end view illustrating a welding operation in accordance with an embodiment of the present invention.

FIG. 5 illustrates a welding operation in accordance with the present invention wherein two sets of steel pieces, 20, 21 have been integrated into a single roll-formed product 38 wherein each of the two sets of steel pieces 20, 21 are unconnected only in the areas where projections 24 on steel pieces 20 are to be welded to edge portions 25 on steel pieces 21. All of projections 24, as well as the other bends and turns in steel pieces 20, 21 of part 38 may be formed in a single roll-forming procedure, upstream of the welding operation illustrated in FIG. 5. Both the roll-forming procedure and the welding operation can be part of a continuous manufacturing line wherein the roll-forming is performed at a pre-determined speed, and the speed of advancement of the welding zone, in the welding operation illustrated in FIG. 5, is the same as the pre-determined roll-forming speed, e.g. between about 350 and about 700 in./min. (between about 889 and about 1,778 cm/min.). A typical welding current range for the operation illustrated in FIG. 5 is between about 4,000 and about 8,000 amperes.

The speed of advancement is limited by the ability of a projection to heat up sufficiently to cause melting. More particularly, the speed of advancement of a projection 24 as it approaches and passes through the welding zone must be sufficiently restrained to concentrate sufficient current density at the projection for a sufficient time to effect the desired weldment at the location of that projection. On the other hand, if the speed of advancement is too slow, the projection can undergo excessive pre-heating and premature collapse, thereby dissipating the current density required to effect the desired weldment at the location of the projection. Accordingly, the speed of advancement must be sufficiently rapid to avoid the excessive pre-heating and premature collapse described in the preceding sentence. A speed of advancement in accordance with the present invention satisfies all of the requirements described in the preceding part of this paragraph.

The rate at which a projection 24 collapses as it advances into and through the welding zone is also affected by a number of other factors including: the projection geometry (i.e. a projection's resistance to collapse, resulting from its configuration); the welding force exerted through the welding wheels (the greater the force the faster the collapse); and the welding current (more current produces more heat which in turn produces a faster collapse).

By employing a series of aligned projection in accordance with the present invention, the area of contact between superimposed portions 22, 25 of steel pieces 20, 21 is reduced to either a point (in the case of dimple-like projections 24) or a line (in the case of continuous elongated ridge 26), thereby substantially increasing the current density in the area of contact, compared to a situation in which a flat edge portion was employed instead of the projections. Because of this increase in current density, less time is required to heat that part of the steel piece which is to undergo welding, thereby allowing an increased speed of advancement (i.e. increased welding speed). If, when projections are employed in lieu of a flat edge portion, the speed of advancement is not increased but instead is maintained at the same speed as that employed before the projections replaced the flat edge portion, there is a danger of excessive pre-heating and premature collapse of the type described in the preceding two paragraphs.

Each of the aligned projections in a given series has substantially the same width at its base. This is so whether the aligned projections in a series are formed as spaced-apart dimples 24 or as a continuous elongated ridge 26.

Each welding wheel 28, 29 has a circumferential surface 30, 31, respectively, for contacting the sandwiched edge portions 22, 25 of steel pieces 20, 21. In the embodiments illustrated in FIGS. 1 and 5, circumferential surfaces 30, 31 are flat in the direction of width of the circumferential surface. The width of surfaces 30, 31 should be wider than the width of a projection 24 or 26 at its base. Otherwise, one may not obtain a wide welding current range. In one embodiment, wherein each of the aligned projections in a series had a width at its base of 0.35 inches (0.89 cm), each wheel 28, 29 had a circumferential surface 30, 31 with a width of 0.75 inches (1.91 cm), and a wide welding current range was attained. Wider circumferential surface widths could also have been employed; in theory the circumferential surface cannot be too wide from the standpoint discussed above. Generally, the width of the circumferential surface of the welding wheel should be at least 1.5 times the width of the aligned projections at their base. A circumferential surface having a width the same as the width of a projection at its base would be insufficient.

Narrowing the circumferential surface on a welding wheel can produce an increase in current density at the welding zone, thereby enabling one to increase the speed of advancement through the welding zone, but it will also produce a decrease in the welding current range, which can drop below 3,000 amperes, and that would be undesirable. By employing a series of aligned projections, one can (a) obtain a current density sufficient to allow a relatively rapid speed of advancement while at the same time (b) attaining a welding current range in excess of 3,000 amperes, and all this can be accomplished without narrowing the circumferential surface on the welding wheel.

A circumferential surface which is relatively wide (as defined above), avoids deformation of the steel piece without the projections, at the portion of that steel piece engaged by a welding wheel, and also avoids any surface marking caused by such deformation, both of which are drawbacks that can occur if the circumferential surface of the welding wheel is too narrow.

In addition to employing a wide circumferential surface which is flat (FIGS. 1 and 5) one may also employ a wide circumferential surface which is convex, i.e. a convex surface with a relatively large radius of curvature (e.g. 2 in. or 5.1 cm) so as to avoid deformation and the like, of the type described in the preceding paragraph.

In accordance with the present invention, when a series of aligned projections are employed, the welding force, i.e. the compressive force applied by urging the two welding wheels towards each other, should be controlled in the manner described below. Generally, as the weld force is increased from a relatively small force, the welding current range increases, up to a certain optimum force. Thereafter, any further increase in the weld force results in a decrease in the current range. This is because too much force flattens a projection prematurely, and the net affect is as though the steel piece were flat in the area of the welding zone. The optimum weld force, i.e. the weld force at which the welding current range is at a maximum, can be determined empirically. In any event, the weld force should be above the minimum force required to produce a welding current range greater than 3,000 amperes; the weld force should also be below a maximum force which causes the welding current range to drop below 3,000 amperes.

Generally, the size of a weldment is determined by the welding current employed. The size of a weldment is also determined by the width of a projection at its base. A weldment can never be wider than the width of a dimple 24 at its base or wider than the width of a ridge 26 at its base. When the series of aligned projections are in the form of an elongated continuous ridge 26, a continuous linear weld is formed. When the series of aligned projections are in the form of spaced-apart dimples 24, a series of spaced-apart weldments 36 is formed (FIG. 6). The closer the dimples 24, the closer the weldments 36, until eventually, the dimples become so close together that the weldments 36 form a continuous linear weld. In one embodiment, employing dimples 24, the dimples were spaced apart about three quarters of an inch (1.9 cm) from center to center and a series of spaced-apart weldments 36 were obtained. The size of the weld is also inversely proportional to the speed of advancement.

A method in accordance with the present invention can be utilized with uncoated steel or coated steel. However, when utilized with coated steel, the series of aligned projections must be in the form of spaced-apart dimples 24; an elongated continuous ridge 26 should not be employed. This is discussed in more detail below.

When steel is coated with a corrosion-resistant metal such as zinc, aluminum, or the like, it is less amenable to resistance welding then is an uncoated steel. This is because the coating has less electrical resistivity than the base metal (steel), and a given welding current produces less resistance heating on the coated steel compared to the same steel without a coating.

When a series of aligned projection in the form of an elongated continuous ridge 26 is employed, resistance heating of a coated steel is not sufficient to enable practical utilization of a method otherwise in accordance with the present invention. However, when a series of aligned projections in the form of spaced-apart dimples 24 are employed on a coated steel, a method in accordance with the present invention may be readily practiced. This is because, when spaced-apart dimples 24 are employed, the pre-heating which occurs at projection 24b (FIG. 6) is sufficient to melt the lower melting point coating metal at the tip of projection 24b, thereby exposing the base metal (steel) which is more readily susceptible to resistance heating. By employing dimples 24 on the coated piece of steel, the coating on the tip of the projection is removed before flattening occurs, thereby allowing welding to take place. The spaced-apart projections 24 should be sufficiently close together to preheat and to remove coating metal from projection 24b before the application of pressure thereto by the welding wheels, when the wheels are applying pressure to adjacent projections 24c–24e. On the other hand, projections 24 should be sufficiently spaced apart to avoid a situation in which flattening of the projections is produced without welding between the two steel pieces; that is what happens when the series of aligned projections on the coated piece of steel are in the form of a continuous elongated ridge 26. The correct spacing can be determined empirically. In some embodiments spacings of 0.75 in. (1.91 cm) and 0.40 in. (1.0 cm) have been satisfactory.

Coated steels to which the present invention is applicable include galvanized steels, both electro-galvanized and hot dip galvanized. The coating weight on a galvanized steel strip may be 60 g/m$^2$ per side, or 30 g/m$^2$ per side, for example. The coated steel may be hot dip coated with other coatings such as aluminum or with a terne coating (lead-10% tin). The coated steel may be a galvannealed steel in which the coating is an iron-zinc alloy. The coating may also be an alloy of zinc and 5% aluminum.

Coated steels inherently have narrower current ranges than uncoated steels. High strength steels (to be defined below) also inherently have narrower current ranges than lower strength steels. One embodiment of a projection resistance welding method in accordance with the present invention provides a current range as high as 7,000 amperes on a high strength, zinc coated steel having a coating weight of 30 g/m$^2$ per side or of 60 g/m$^2$ per side. The composition of the steel base for this coated steel is listed below, in wt.%.

| | |
|---|---|
| Carbon | 0.18–0.20 |
| Manganese | 0.45–0.55 |
| Titanium | 0.04–0.06 |
| Boron | 0.0008 |
| Aluminum | 0.035–0.065 |
| Silicon | 0.015 max. |
| Phosphorus | 0.02 max. |
| Sulfur | 0.015 max. |

In the foregoing composition, the balance consists essentially of iron.

The high strength steel described above typically has a tensile strength of at least about 195,000 psi (1343 MPa). Generally, as used herein, the term high strength steel refers to a steel having a yield strength greater than about 50,000 psi (345 Mpa).

A method in accordance with the present invention is applicable not only to high strength steels, coated or uncoated, but also to lower strength steels such as those employed because of their superior drawing qualities (e.g. sheet steel used to fabricate automotive body parts).

Because a method in accordance with the present invention maintains a relatively wide welding current range, i.e. greater than 3,000 amperes, typically between about 4,000 and about 8,000 amperes, the method can be characterized as robust. Because it is robust, the method can accommodate a number of unavoidable variables which, without such robustness, could result in defective welding. These variables include surface variations on the steel, such as rust or roughness, variations within a coil of steel from which the steel pieces are obtained, variations among different coils employed in a given welding Operation over a period of time, electrode wear, electrical malfunctions, power line fluctuations, and wheel pressure changes due to mechanical factors in the pressure mechanism. Even well maintained welding equipment can undergo variations which could cause a variation in welding current of several hundred amperes. The method can also accommodate avoidable variables including poor maintenance on the weld wheels, projection dimensions which are off specification, and various human errors. In other words, one employing a method in accordance with the present invention can be careless and make a lot of mistakes yet still obtain a good weld.

Another advantage of a method in accordance with the present invention is increased electrode life, i.e. the length of time an electrode may sometimes be employed before it produces bad welds. Electrode life may be increased a whole order of magnitude when a method in accordance with the present invention is employed.

In the embodiments described above, both steel pieces 20, 21 were formed from the same strip of steel. In other embodiments in accordance with the present invention, each of steel pieces 20, 21 may originate from a different type of steel. For example, one steel piece may be uncoated while the other may be coated. In a case where one of the steel strips is uncoated, and both steel strips are relatively low strength (i.e. below 50,000 psi (345 MPa), yield strength), one may enjoy the advantages of the present invention by employing a series of aligned projections in the form of a continuous elongated ridge 26 (FIG. 3). In such a case, the projections would be formed on the coated steel strip. In the case where both pieces of steel are coated, the series of aligned projections must be in the form of spaced-apart dimples 24 (FIG. 4).

In summary, the advantages resulting from a method in accordance with the present invention include: operating at a faster speed of advancement; increased robustness and increased ability to produce good welds for every weld in a long series of welds; reduced distortion; and less heat input around the weld per unit length of the steel piece, due to localized heat input and a smaller area undergoing heating. In addition, there is less deformation or marking on the one steel piece which is without projections (e.g. steel piece 21). Deformation occurs only on the other piece of steel, having the projections (e.g. steel piece 20). The one steel piece (21) has a relatively good appearance and can be exposed to view.

The welding current range can be affected by a number of factors including projection width, projection depth, weld force, speed of advancement, coating weight, etc. Some examples of some of these factors and their effect on welding current range are discussed below.

Two uncoated, cold rolled strips of high strength steel having the specific composition described above were subjected to projection resistance welding. The strips were 0.045 in. (0.144 cm) thick. A series of aligned projections defining a continuous elongated ridge was formed on one strip. The ridge was about 18 in. (46 cm) in length; it had a width at its base of about $7/16$ in. (1.1 cm) and a depth of about ¼ in. (0.6 cm). The speed of advancement (welding speed) was 700 in./min. (1778 cm/min.). The upper and lower welding wheels each had a diameter of 12 in. (30.5 cm) and a flat circumferential surface with a width of 1 in. (2.54 cm). At a weld force of 1750 lbs. (788 kg), a welding current range of 3500 amperes was obtained. At lesser weld forces of about 1200 lbs (540 kg) and about 600 lbs. (270 kg), respective welding current ranges of about 2,500 A and about 1,500 A were obtained; at a greater weld force, 3000 lbs. (1350 kg), a welding current range of about 1,250 A was obtained. This reflects increasing welding current range with increasing weld force up to an optimum weld force and then decreasing welding current range with further increases in weld force.

Two electrogalvanized steel strips having the base steel composition and thickness described in the preceding paragraph were projection resistance welded. The zinc coating weight was 60 g/m$^2$ on each side of both strips. A series of aligned projections defining a continuous elongated ridge was formed on one strip, and welding speeds between 250 and 700 in./min. (635–1778 cm/min.) were employed at weld forces in the range 600–1750 lbs. (270–788 kg). The ridge had the dimensions described in the preceding paragraph. These electrogalvanized strips were unweldable at welding speeds substantially above 250 in./min. (635 cm/min.); a welding speed at 250 in./min. (635 cm/min.) provided a welding current range of 1,500 A at a weld force of 900 lbs. (405 kg). The combination of (1) a welding speed greater than 250 in./min. (635 cm/min.) and (2) a welding current range greater than 3,000 A was not obtainable on electrogalvanized steel strips when the series of aligned projections defined a continuous elongated ridge.

The electrogalvanized steel strips described in the preceding paragraph were subjected to another set of projection resistance welding operations, except in this set, the series of aligned projections comprised a plurality of spaced-apart dimples. The spacing distance was 0.40 in. (1.0 cm) from dimple center to dimple center over a length of 12 in. (30.5 cm). The dimples had a width (diameter) of 0.18 and 0.25 in. (0.46 and 0.64 cm) at the base of a dimple and a depth of 0.06 in. (0.15 cm). A weld force of 1000 lbs. (450 kg) was employed. The dimple width of 0.18 in. (0.46 cm) was employed at welding speeds of 350, 450 and 600 in./sec. (889, 1143 and 1524 cm/sec.); the dimple width of 0.25 in. (0.64 cm) was employed at welding speeds of 150 and 225 in./sec (381 and 572 cm/sec.) Welds were obtained at welding speeds from 150 to 600 in./min. (381–1524 cm/min.) at a fixed welding current of 29 KA. At a welding speed of 600 in./min. (1524 cm/min.), the welding current range was 6,000 A. Thus, when the series of aligned projections comprises spaced-apart dimples, one can obtain the combination of (1) a welding speed greater than 250 in./min. (635 cm/min.) and (2) a welding current range greater than 3,000 A, when projection resistance welding electrogalvanized strips of high strength steel.

Another set of welding operations was conducted on the electrogalvanized high strength steel strips described above. The purpose of this set of operations was to determine the optimum dimple dimensions (i.e. dimple depth and dimple diameter or width at the dimple's base). One strip in each set of two strips was formed with spaced-apart dimples having a spacing of 0.40 in. (1.0 cm) from dimple center to dimple center, over a 12 in. (30.5 cm) length. The weld force was 1200–1300 lbs. (540–585 kg). The upper and lower welding wheels had respective diameters of 18 in. (45.7 cm) and 8 in. (20.3 cm), and each wheel had a flat circumferential surface with a width of 0.75 in. (1.91 cm). The dimple width at its base and the dimple depth were varied to determine the optimum dimple dimensions at three welding speeds: 50 in./min. (889 cm/min.); 525 in./min. (1334 cm./min.) and 700 in./min. (1778 cm./min.). Dimple widths of 0.11 in. (0.28 cm), 0.18 in. (0.46 cm) and 0.25 in (0.64 cm) were employed; dimple depths of 0.030 in. (0.08 cm), 0.045 in. (0.11 cm) and 0.055 or 0.060 in. (0.14 or 0.15 cm) were employed.

Welding current ranges were determined for each combination of the three variable parameters (dimple depth, dimple width and welding speed). The welding current range is the difference between (1) a minimum current (the current required to produce a weld for every dimple in a series of aligned dimples (e.g. 25 to 30 dimples)) and (2) maximum current which is either the expulsion current or a reverse current. The expulsion current is the current required to produce either surface melting on a steel strip or heavy expulsion at the interface between the two strips, i.e. at the weldment. The reverse current reflects a phenomenon associated with a dimple of improper design which causes the dimple to mash down excessively rapidly. The reverse current is the current at which weldment size stopped growing with increased current and progressively declined with further current increase. With the improperly designed dimples described above, a no-weld condition could occur not only at currents below the minimum current but also at currents substantially above the reverse current.

The data obtained from the tests described in the two preceding paragraph were mathematically analyzed and graphically displayed. The mathematical analysis of the data employed the following equation:

$$0.000053 \times (Welding\ Speed)^2 - 8923 \times (Dimple\ Depth)^2 - 101.4 \times (Dimple\ Diameter)^2 + 1181 \times Dimple\ Diameter \times Dimple\ Depth + 0.533 \times Welding\ Speed + 665.9 \times Dimple\ Depth - 26.8 = 0.$$

The graphical depiction employed a three-dimensional display in which the coordinates were dimple depth, dimple diameter and current range; the resulting two-dimensional curved surface was shaped like a paraboloid. A similarly-shaped curved surface was developed for each of the three welding speeds. The optimum dimensions occurred at the peak of the paraboloid.

The aforementioned mathematical analysis and graphical depiction predicted optimum dimple dimensions of 0.035 in. (0.09 cm) diameter and 0.060 in. (0.15 cm) depth. Dimple dimensions above and below the optimum predicted dimensions resulted in decreased welding current ranges, at all three welding speeds. The optimum welding speed among the three was 525 in./min. (1334 cm/min.), and it produced a predicted welding current range of 6.6 KA with a standard deviation of 1.0 KA. At 350 in./min. (889 cm/min.) a current range of about 5.0 KA was predicted when employing the optimum dimple dimensions described above; and at 700 in./min. (1778 cm/min.), a current range of about 4.0 KA was predicted.

Verification tests were conducted employing the aforementioned predicted optimum dimple dimensions, with the following results: at a welding speed of 525 in./min. (1334 cm/min.), current ranges of 7.7 and 8.3 KA were obtained; at a welding speed of 700 in./min. (1778 cm/min.) current ranges of 7 and 7.5 KA were obtained. In these verification tests, the dimple spacing was 0.75 in. (1.9 cm) from center to center, over a length of 60 in. (152.4 cm), and the weld force was 1200–1300 lbs. (540–585 kg). The electrogalvanized steel strips employed in these verification tests had the same composition, strength, thickness and coating weights as the steel strips employed in the tests conducted to determine the optimum dimple dimensions (described above). The welding wheels also had the same dimensions and configurations as in the optimization tests.

The verification tests were conducted in the course of performing welding operations for producing a product such as 38 shown in FIG. 5. As shown in FIG. 5, there were two rows of dimples 24; the dimples in one row were staggered in relation to the dimples in the other row. In some operations the diagonal distance between a dimple in one row and the closest dimple in another row was about 0.30 in. (0.76 cm); in other operations the distance was 0.44 in. (1.12 cm). In some operations, one row at a time was welded; in other operations, both rows were welded simultaneously. The latter employed the 700 in./min. (1778 cm/min.) welding speed described above.

In commercial applications, the welding wheels are water cooled by directing a stream of water toward the welding wheels adjacent the welding zone. Excessive flooding with cooling water should be avoided as that can cause weld embrittlement and surface defects (depending upon the weld force), particularly when one employs high strength steels of the type described above. Generally, one should limit the amount of cooling water to that amount necessary to maintain a reasonable electrode life. The weld force is adjusted to accommodate to the cooling water flow rate. Generally, surface cracking of the steel at the base of a dimple can be prevented by increasing the weld force; a higher weld force is required for this purpose when water cooling is employed; and generally, the greater the water cooling rate, the higher the required weld force. Optimum conditions can be determined empirically. In one embodiment of a welding operation for making a product such as that shown at 38 in FIG. 5 and utilizing the electrogalvanized steel strips described above, the optimum weld force, at a welding speed of 300 in./min. (762 cm/min.) and a moderate cooling water flow rate, was in the range of about 2345–2485 lbs. (1055–1118 kg), and the current range was about 5,500 A.

The foregoing detailed description has been given for clearness of understanding only, and no unnecessary limitations should be understood therefrom, as modifications will be obvious to those skilled in the art. For example, the present invention may be employed for projection resistance welding of three pieces of steel arranged as a sandwich. In this embodiment an aligned series of projections would be formed on each of two outer pieces of steel, with the projections facing toward the inner piece of steel.

In another embodiment, the lower of the two welding wheels may be replaced by an elongated, stationary, copper backing bar which functions as the lower electrode and extends the length of the steel pieces undergoing welding. Other than the lower electrode, the system of this embodiment would be as shown in FIG. 1. To advance the welding zone, one would either move steel pieces 20, 21 in the direction of arrow 32, or move the upper electrode (welding wheel 29) in an opposite direction.

I claim:

1. A method for projection resistance welding at least two unconnected pieces of steel each derived from a steel strip, said method comprising:

forming a series of aligned projections on a portion of one of said pieces of steel;

arranging another of said pieces of steel so that a portion thereof is in superimposed relation with said series of projections on said one piece of steel;

sandwiching said superimposed portions between a pair of electrodes comprising at least one rotatable welding wheel, at a welding zone;

moving either (a) said two pieces of steel or (b) each welding wheel to advance said welding zone;

rotating each welding wheel as said welding zone advances;

applying pressure to said sandwiched portions, through said electrodes as each welding wheel rotates, to flatten said projections;

applying a continuous welding current to said superimposed portions, through said electrodes, to concentrate the current at said projections and form weldments where the projections are flattened;

employing a speed of advancement at said welding zone greater than 250 inches per minutes (635 cm per minute);

and maintaining a welding current range greater than 3,000 amperes by employing at least one of the following expedients: (a) controlling said pressure applied through said electrodes, (b) controlling said speed of advancement, and (c) selecting an appropriate configuration and dimensions for said series of aligned projections;

said method being characterized by a welding current range greater than 3,000 amperes at all speeds of advancement in the range 350–700 inches per minute (889–1778 cm per minute).

2. A method as recited in claim 1 wherein:

said projections are formed by roll forming;

said roll forming proceeds at a predetermined speed;

and said speed of advancement of the welding zone is the same as said predetermined roll forming speed.

3. A method as recited in claim 1 and comprising:

forming each of said aligned projections with substantially the same width at its base;

providing each welding wheel with a circumferential surface for contacting said sandwiched portions of steel;

said circumferential surface having a width at least about 1.5 times the width of a projection at its base.

4. A method as recited in claim 3 wherein:

said circumferential surface on a welding wheel is flat in the direction of its width.

5. A method as recited in claim 3 wherein:

said circumferential surface on a welding wheel is convex in the direction of its width.

6. A method as recited in any of claims 1 and 3–5 wherein:

said pressure applying step is performed without causing deformation or marking on the steel piece without said projections.

7. A method as recited in claim 1 wherein:

said series of aligned projections comprises a plurality of spaced-apart dimples.

8. A method as recited in claim 7 wherein:

said one piece of steel having said aligned projections comprises a steel base and a coating of metal having a lower melting point and less resistivity than said steel base;

and said spaced apart projections are sufficiently close to pre-heat and remove coating metal from a projection before the application of pressure to said projection by said electrodes, when the wheels are applying pressure to an adjacent projection.

9. A method as recited in claims 7 or 8 wherein:

said projections are sufficiently spaced apart to avoid a situation in which flattening occurs without welding.

10. A method as recited in claim 1 or claim 7 wherein:

said one piece of steel is a high strength steel having a yield strength greater than 50 ksi (345 Mpa).

11. A method as recited in claim 10 wherein:

said one piece of steel has a tensile strength of at least 190 ksi (1309 Mpa).

12. A method as recited in claim 1 wherein:

said series of aligned projections define a continuous elongated ridge and said one piece of steel is uncoated.

13. A method as recited in claim 1 wherein:

said one piece of steel having said aligned projections comprises a steel base and a coating of metal having less resistivity than said steel base.

14. A method as recited in claim 1 wherein;

said speed of advancement is between 350 and 700 inches per minute (between 889 and 1778 cm per minute).

15. A method as recited in claim 1 or claim 14 wherein:

said speed of advancement is sufficiently rapid to avoid such excessive preheating and premature collapse of a projection as would dissipate the current density required to effect the desired weldment at the location of said projection;

and said speed of advancement is sufficiently restrained to concentrate sufficient current density for a sufficient time to effect the desired weldment at the location of said projection.

16. A method as recited in claim 1 wherein:

said welding current range is between 4,000 and 8,000 amperes.

17. A method as recited in claim 1 and comprising:

applying a compressive weld force at said welding zone, through said electrodes;

controlling said weld force between maximum and minimum limits which will maintain said previously recited welding current range;

and avoiding the application of such excessive weld force as will cause the welding current range to drop below 3,000 amperes.

18. A method as recited in claim 1 wherein:

said one piece of steel having said aligned projections comprises a steel base and a coating of metal having less resistivity than said steel base;

and said series of aligned projections comprises a plurality of spaced-apart dimples.

19. A method as recited in claim 18 wherein:

said welding current range is between 4,000 and 8,000 amperes.

20. A method as recited in claim 19 wherein:

said speed of advancement is between 350 and 700 inches per minute (889 and 1778 cm per minute).

21. A method as recited in claim 18 wherein:

said speed of advancement is between 350 and 700 inches per minute (889 and 1778 cm per minute).

22. A method as recited in claim 1 wherein:

said method is characterized by a welding current range greater than 5,000 amperes at all speeds of advancement in the range 350–600 inches per minute (889–1524 cm per minute).

23. A method as recited in claim 1 wherein:

said speed of advancement is between 350 and 700 inches per minute (889 and 1778 cm per minute);

and said welding current range is between 4,000 and 8,000 amperes.

24. A method as recited in claim 23 wherein:

said speed of advancement is between 525 and 700 inches per minute (1334 and 1778 cm per minute);

and said series of aligned projections comprises a plurality of spaced-apart projections.

\* \* \* \* \*

UNITED STATES PATENT AND TRADEMARK OFFICE
CERTIFICATE OF CORRECTION

PATENT NO. : 5,473,133
DATED : December 5, 1995
INVENTOR(S) : Warren A. Peterson It is certified that error appears in the above-indentified patent and that said Letters Patent is hereby corrected as shown below:

Col. 8, line 48,   "Operation" should be --operation--.

Col. 10, line 40,  "50 in./min." should be --350 in./min.--.

Signed and Sealed this

Twenty-third Day of April, 1996

Attest:

BRUCE LEHMAN

Attesting Officer    Commissioner of Patents and Trademarks